Inventor
Thomas S. Skillman
By Ward, Crosby & Neal
Attorneys

Inventor:
Thomas S. Skillman
By Ward, Crosby & Neal
Attorneys

Inventor:
Thomas S. Skillman
By Ward, Crosby & Neal
Attorneys.

COIN-OPERATED VENDING MACHINE

Filed March 3, 1951 11 Sheets-Sheet 4

Inventor:
Thomas S. Skillman
By Ward, Crosby & Neal
Attorneys

Inventor:
Thomas S. Skillman
By Ward, Crosby & Neal
Attorneys

May 24, 1955 T. S. SKILLMAN 2,708,996

COIN-OPERATED VENDING MACHINE

Filed March 3, 1951 11 Sheets-Sheet 6

Inventor:
Thomas S. Skillman
By Ward, Crosby & Neal
Attorneys.

COIN-OPERATED VENDING MACHINE

Filed March 3, 1951 11 Sheets-Sheet 7

Inventor:
Thomas S. Skillman
By Ward, Crosby & Neal
Attorneys

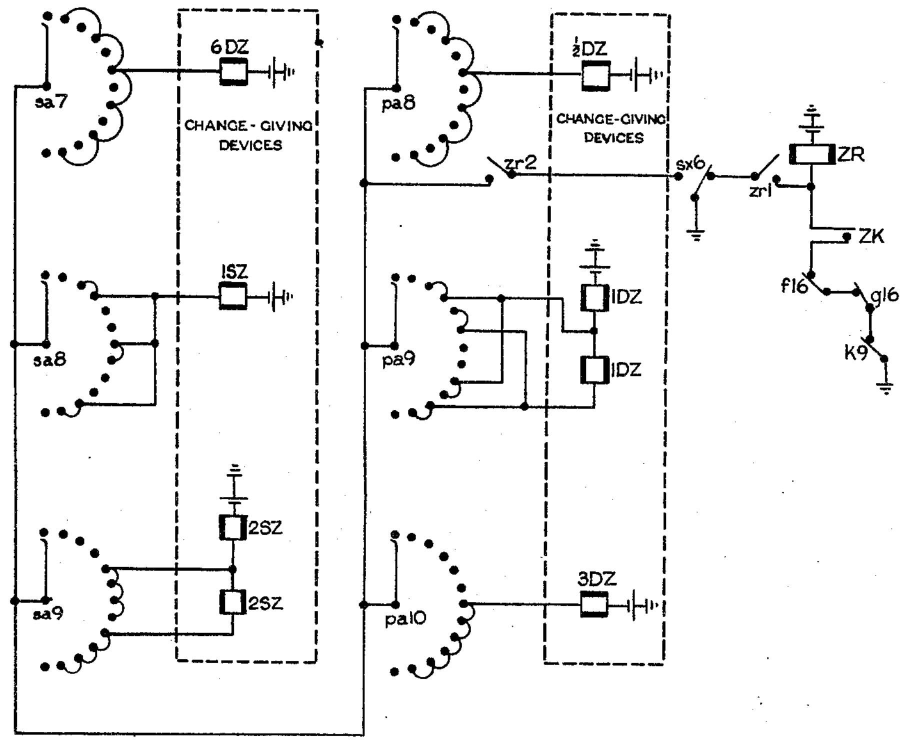
FIG. 9
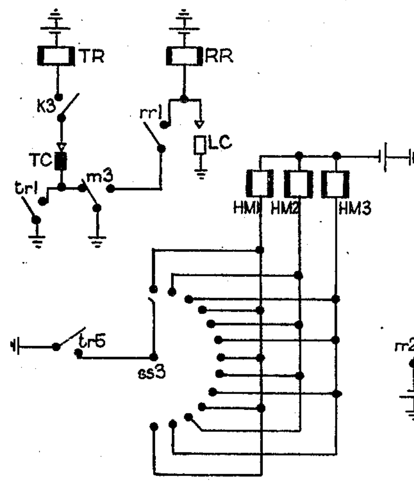
FIG. 10
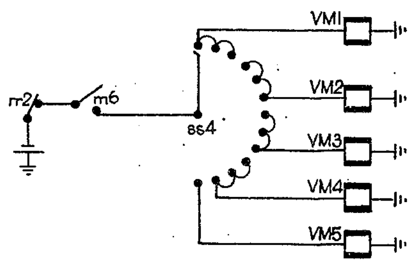
Inventor:
Thomas S. Skillman
By Ward, Crosby & Neal
Attorneys May 24, 1955 T. S. SKILLMAN 2,708,996

COIN-OPERATED VENDING MACHINE

Filed March 3, 1951 11 Sheets-Sheet 9

Inventor:
Thomas S. Skillman
By Ward, Crosby & Neal
Attorneys.

COIN-OPERATED VENDING MACHINE

Filed March 3, 1951

Inventor:
Thomas S. Skillman
By Ward, Crosby & Neal
Attorneys

May 24, 1955 T. S. SKILLMAN 2,708,996

COIN-OPERATED VENDING MACHINE

Filed March 3, 1951 11 Sheets-Sheet 11

Inventor:
Thomas S. Skillman
By Ward, Crosby & Neal
Attorneys

United States Patent Office 2,708,996

Patented May 24, 1955

2,708,996

COIN-OPERATED VENDING MACHINE

Thomas S. Skillman, Mosman, near Sydney, New South Wales, Australia, assignor to Punch Engineering Pty. Limited, Cammeray, near Sydney, New South Wales, Australia, a corporation of New South Wales, Australia Application March 3, 1951, Serial No. 213,792

Claims priority, application Australia March 8, 1950

18 Claims. (Cl. 194—10)

This invention relates to customer operated vending machines, and provides a machine of this description capable of selling any article or articles selected by the customer from a wide range carried. All articles selected are delivered to a single collecting point, and are paid for at the one time by the insertion of coins in a single set of coin slots.

Vending machines are known which either deliver any of a small number of articles, all of the same value, on the insertion of the appropriate coin in a single coin slot, or which deliver any of a small number of articles of different values on the insertion of the appropriate coin in a coin slot allotted to the kind of article required. The vending machine according to the invention, however, handles a wide range of articles of different shapes and sizes, and is adapted to sell one or several of these for the one payment.

According to the invention the vending machine which can store and dispense one or a plurality of selected articles of various characters, has value recording means which can be pre-set in accordance with the value of each article to be dispensed and a coin-operated device which is adapted to accept a plurality of coins of the same or various denominations. This coin-operated device establishes a credit which is registered, and on the selection of an article, checking means compare the value of the selected article with the established credit and permit the dispensing of the article only when the credit is at least equal to the value of the article. On the release of an article the credit is automatically reduced by the value of this article.

It is another feature of the invention to use rectifiers in the checking circuits which block the release of articles when the credit is lower than the value of an article.

These and other features of the invention will be more apparent from the following description.

The articles to be sold are stored according to kind in or on individual storage devices which may be of any suitable kind, and are selectively released therefrom by the operation over electrical control circuits of releasing devices individually associated with each storage device. Common conveying means are provided to transport the articles so released to a collecting point, where they are available to the customer. The opening at the collecting point is protected from rats and other vermin by a door, which may be of glass or other suitable material and which, while normally closed, either opens automatically or can be opened by the customer when articles are to be collected.

The electrical control circuits which operate the releasing devices are controlled from contact devices operable by the customer, who thus selects the articles he wishes to purchase. However no releasing device will operate unless coins to the value of the kind of article released thereby have been inserted into the machine and still stand to the customer's credit. The amount of the credit required for the operation of any releasing device may be varied by a simple adjustment, to cover price variations or a change in the kind of article carried by a particular storage device.

The customer establishes his credit by inserting coins of various denominations in appropriate coin slots, or in a single coin slot if means are provided to sort the coins automatically into denominations. Each coin is tested by a suitable slug rejector, and if accepted operates a micro-switch which electrically registers the value of that coin and marks it to the customer's credit. As coins are inserted the amount standing to the customer's credit is progressively registered, and the total indicated.

When a credit has been thus established the customer proceeds to selectively release the articles he requires. As each article is released its price is subtracted from his credit, and the new amount indicated. The operation of the appropriate contact device will cause the release of any article the price of which does not exceed the amount standing to the customer's credit. Provision may be made for the giving of change, the balance standing to a customer's credit when he has collected all the articles he desires being returned to him. Further coins may be inserted at any time to increase the credit available.

Coins inserted by the customer and accepted by the coin testing devices may be held temporarily in an intermediate position before being irrevocably collected by the machine. Provision may be made to enable the customer to view such coins through a glass window or the like so that he can compare the amount he has inserted with the amount indicated as standing to his credit. Furthermore, means may be provided to enable the customer to recover the coins he has inserted at any time before he begins to operate the contact devices for the release of articles. If he does recover his coins in this way his credit is automatically cancelled.

On the release of the first article the coins are collected by the machine, preferably into a self-sealing coin box.

To assist the customer is deciding on his purchases a display cabinet may be provided at the front of the machine, holding a sample of each kind of article carried. Beside each sample the price of that kind of article may be displayed, and in addition two lamps of different colours can be arranged to indicate whether the article is available or out of stock. These lamps may be automatically operated by a changeover contact at the end of the storage device carrying the corresponding kind of article, the "available" lamp being lighted when there is an article at the end of the storage device ready for release, and this lamp being extinguished and the "out of stock" lamp lighted when there is no article in this position.

The contact devices for the release of articles are operated via keys or push-buttons which may be arranged on a panel in the same relative order as the samples of the various kinds of articles together with small reproductions of the relevant articles thus enabling the customer to identify without difficulty the push-buttons for the articles he requires.

Facilities may be provided to allow more than one customer to operate the machine at the same time. For example, a plurality of coin-receiving mechanisms, credit registering and indicating means and customer-operated contact sets may be provided, with diverting means to guide articles to various collecting points. One customer may then be inserting coins and establishing his credit while another is releasing articles, so that as soon as the latter has finished the former may begin to release the articles he requires. The diverting means may operate automatically under electrical control to divert articles to the collecting point associated with the contact set from which they were selected.

Alternatively, means may be provided to store the selections made at various contact sets in electrical registers, and to forward them successively to the releasing devices, so that a plurality of customers can insert their coins, select the articles they require, and then receive their purchases in order, the diverting means operating automatically to route the articles to the appropriate collecting points. Since the electrical circuits are particularly fast in their operation, and the distance between the storage devices and the collecting points is small, no customer will have to wait any appreciable time for his purchases.

The vending machine according to the invention is now described in further detail with reference to the accompanying drawings, in which:

Fig. 1 shows by way of example a suggested arrangement of the exterior of the vending machine;

Fig. 2 gives by way of example a plan view of a suggested arrangement of the interior of the vending machine, showing more or less schematically storage devices, conveying means and collecting point;

Figs. 4, 5, 6, 6A and 7 illustrate circuits which may be used for the operation of the vending machine;

Fig. 9 illustrates circuits for adapting the machine to give change;

Fig. 10 shows a circuit for an embodiment using a different type of storage and releasing device;

Figure 1:
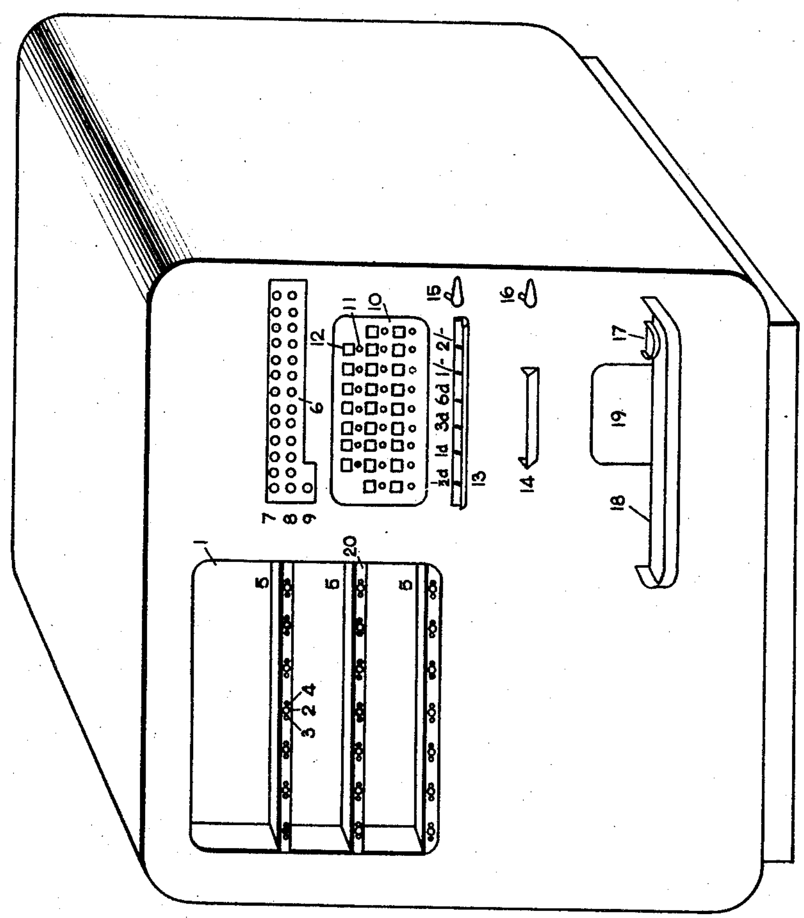

In the suggested arrangement of the exterior of the vending machine illustrated in Fig. 1, a sample of each of the goods handled is displayed behind glass on shelves 5 in a display recess 1. A plate 20 beneath each shelf 5 carries a price tag 2, and "Available" lamp 3 and an "Out of Stock" lamp 4, for each sample on the corresponding shelf. The lamps 3 and 4, as explained above, are controlled from article-operated change-over contacts at the releasing ends of the various storage devices. The shelves 5 may be lighted by any suitable means.

A credit indicator 6 contains shilling lamps 7, penny lamps 8 and a halfpenny lamp 9, the lighting of the appropriate lamps 7, 8 and 9 in the manner explained later indicating to the customer the amount standing to his credit in the machine at any time. Further indicating lamps may be provided to give a customer instructions how to proceed.

A selecting panel 10 contains a push-button 11 for each kind of article handled, and in proximity to each a small reproduction or other identification 12 of an article of the kind released thereby. The push-buttons are preferably arranged in the same order as the samples in the display recess 1.

A coin panel 13 contains a separate slot for the insertion of each denomination of coin, from halfpenny to florin. Alternatively a single slot may be used for all coins, in association with a device which automatically sorts coins according to denomination. Coins of other currencies may also be dealt with in either of the above ways Each coin is tested in a coin tester or slug rejector, and if rejected is deposited in the tray 14, where the customer may recover it. In case a bent coin becomes jammed in a coin tester, a handle 15 is provided which, on being turned by the customer, opens all coin testers and allows any coins caught therein to drop into the tray 14. Coins which pass the coin tester are held temporarily in an intermediate position, and at any time before he has commenced to release articles the customer may, by turning the handle 16, cause these coins to be released to the tray 17, where they are available to him. Operation of handle 16 causes any credit indication to be cancelled.

Articles released by the operation of push buttons 11 are delivered through the opening 19 to the collecting tray 18. Opening 19 may be normally closed by a door which opens automatically to allow articles through.

Figure 2:
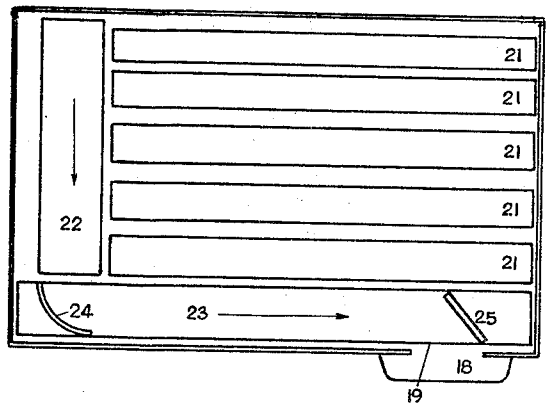

In the interior arrangement of the vending machine illustrated in Fig. 2, the articles are stored according to kind in or on storage devices 21, and are selectively released, by the operation of releasing devices, onto a conveyor bolt 22, from which they are transferred to a second conveyor belt 23, guide member 24 assisting in this operation, to be finally diverted by member 25 through opening 19 to the collecting tray 18. The storage and releasing devices may be of any suitable kind, for example belts with clutches to connect them to a common driving shaft as shown in Fig. 13, or chutes with ejector mechanism as shown in Fig. 14.

Figure 13:
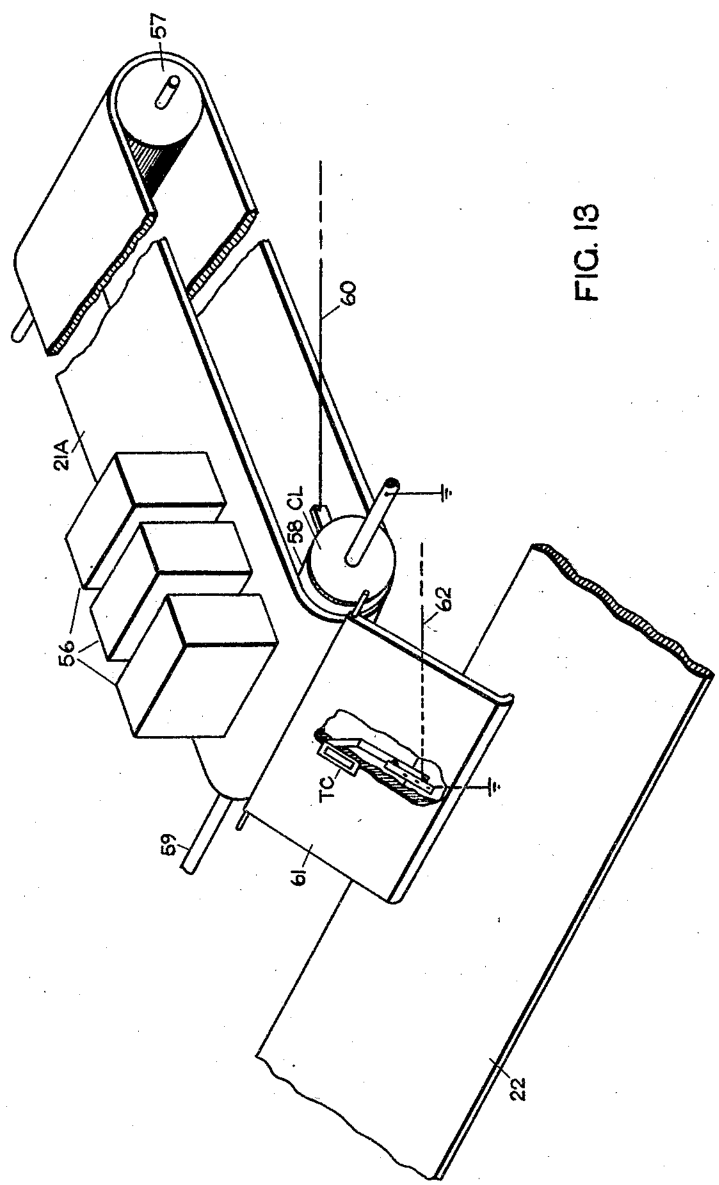
Fig. 13 shows schematically a storage and releasing device in which articles are stored on a movable belt.

A storage and releasing device is shown in Fig. 13, and is similar to the devices shown in United States Patents No. 2,627,941 and No. 2,657,858. It has an horizontally arranged storage belt 21A carrying articles 56 to be dispensed. The belt 21 passes around rollers 57 and 58, the latter being connectable over an electromagnetic clutch CL with a constantly running power driven shaft 59. When the clutch CL is energised, the storage belt 21A which carried the selected article, moves forward until the foremost article topples over roller 58 onto the common conveyor 22. The clutch CL which may be of the type shown in U. S. Patent No. 2,523,772 is operated by an electric circuit over wire 60. When the first article topples from belt 21A it slides over a flap or guide 61 and operates temporarily a trip contact TC, which may be of the type shown in United States Patent No. 2,575,847. This contact TC by means of an electric circuit over wire 62 releases the clutch CL and thus prevents the release of the next article. The various circuits are described later on in connection with Fig. 4.

Figure 14:
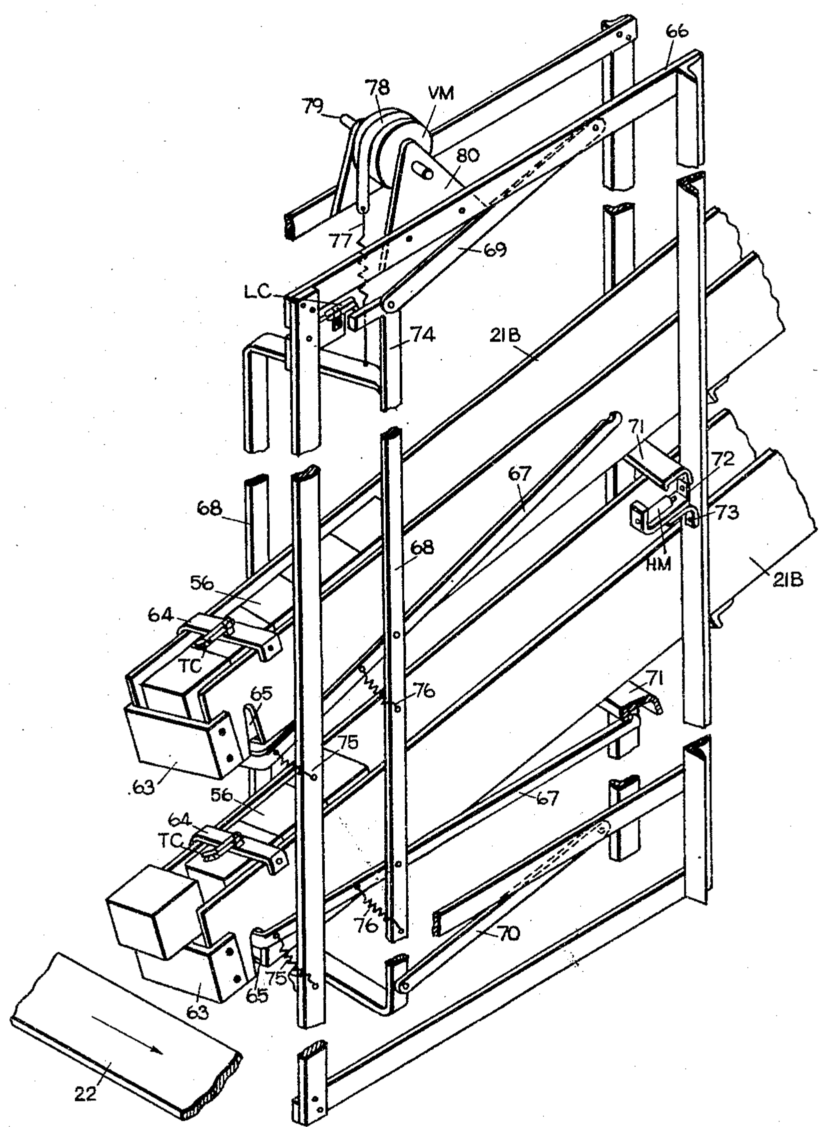
Fig. 14 shows schematically storage and releasing devices which are selected by the operation of horizontal and vertical bars.

Another type of storage and releasing device is shown in Fig. 14, and is described in detail in my co-pending application Serial No. 108,441, filed August 4, 1949. In this arrangement the articles to be dispensed are stored in chutes 21B arranged in horizontal rows and vertical rows or columns upon a framework. The framework 66 shown is only part of the structure which extends to carry the chutes 21B extending in accordance with the amount of articles they have to store. In each chute, articles of a single kind are stored in single file as indicated by the articles 56, and the chutes are preferably inclined sufficiently for the articles to move downward under gravity when not restrained.

Each chute is closed at its front or lower end by an adjustable stop member 63, and an adjustable strap 64 is secured across the top of the chute above the second article in the file to prevent it rising while the foremost article is ejected as described later on. This strap 64 may carry a contact set TC which is temporarily operated each time an article is ejected from the chute.

In the bottom and sides of each chute near their end is a slot 65 which permits the entry into the chute of the end of an L-shaped or preferably U-shaped operating lever or ejector 67, to lift the foremost article 56 over the stop member 63, which is so adjusted that this article extends across or covers the slot 65.

All the operating levers 67 of one vertical row or column of chutes are pivoted upon a common vertical bar 68, which in case of U-shaped operating levers are arranged on both sides of these levers. Each bar arrangement 68 is suspended by a metal strip 78 and spring 77 from the drum of an electromagnetic clutch VM, normally running loosely on a transverse shaft 79 which extends across all the columns of chutes through bearings 80 and is constantly driven by suitable driving means (motor 44 in Fig. 7). The clutch VM can operate in a circuit shown in Fig. 10 and described later on. The bars 68 are constrained to remain during movement parallel to their initial position by radius arms 69, 70 pivoted to them and the framework 66.

In order that an operating lever 67 should become operative to lift an article from a chute it is necessary to provide the lever 67 with a fulcrum about which it may turn when the bar or pair of bars 68 is moved vertically. Without a fulcrum the vertical movement of bar 68 merely tilts the operating lever 67 idly as indicated by the upper lever 67 its front end being held down by spring 75 connecting lever 67 with the framework 66. A second spring 76 connecting the operating lever 67 with bar 68 assists in keeping the lever in the indicated position, as spring 75 has to be rather light not to obstruct the movement of lever 67 for the ejection of an article as described hereafter.

Fulcra are provided for a whole horizontal row of operating levers 67 by a common fulcrum bar 71 supported at its ends upon leaf springs 72 secured to brackets 73 on the rear part of framework 66. These brackets carry electromagnets HM the armatures of which are secured to the leaf springs 72. Excitation of these magnets HM (in the circuits shown in Fig. 10) causes the bar 71 to be moved forward so that its front bent edge engages over the hook-shaped rear ends of a row of operating levers 67 in the manner shown for the lower operating lever 67.

When the rear end of a row of operating levers 67 is thus fulcrumed, lifting of a bar 68 will cause the front end of the operating lever, pivoted at said bar 68 and obstructed by the bar 71, to enter the slot 65 of the corresponding chute and eject an article 56 over the stop member 63 onto a transverse collector belt 22, which carries the article to the desired point of delivery. A separate belt 22 can be provided for each horizontal row of chutes or a common belt can collect articles ejected from various rows.

The strap 64 prevents the second article from being lifted at the same time; as soon as the first article is ejected from the chute, the second moves down so far as permitted by lever 67 and when the lever falls down again, this article moves up against stop member 63 thus covering slot 65.

An indication of discharge of an article may be given by the contact set TC fixed to the strap 64 and a further contact set LC is operated by a projection 74 each time the bar 68 is raised. The functions of these contacts are described in detail later on in connection with Fig. 10.

One row of storage devices 21 only is shown in Fig. 2, but other similar rows may be arranged in vertical relationship, each storage device releasing its articles onto conveyor belt 22, which should be suitably cushioned to break their fall, for example by running it on a bed of linoleum covered by rubber sponge material. Thus five vertically related rows, each comprising five storage and releasing devices, might be used for a machine intended to handle twenty-five kinds of articles.

Figure 3A:
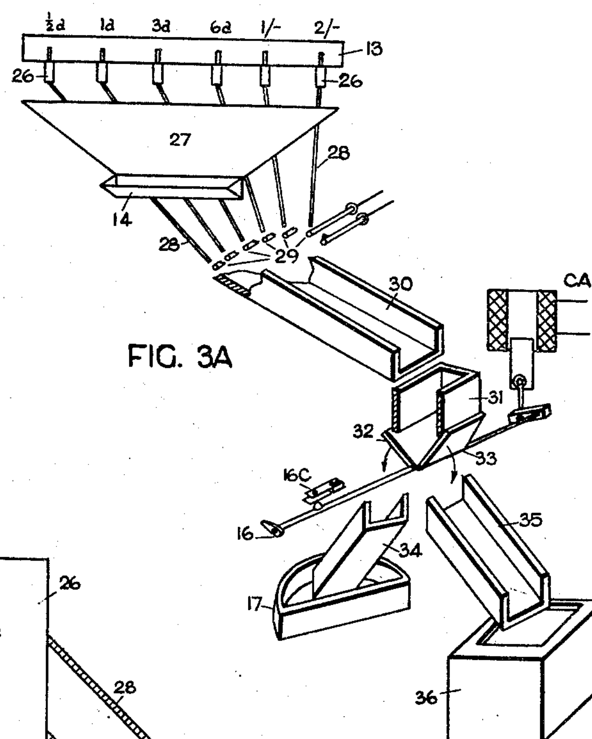
Figs. 3A and 3B show schematically and by way of example a suggested arrangement for the insertion, rejection, acceptance and refund of coins.
Figure 3B:
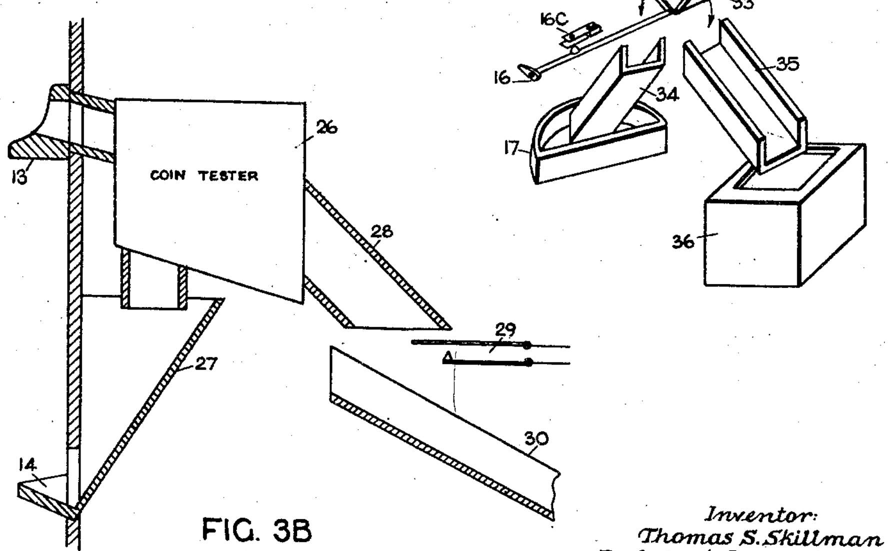

Figs. 3A and 3B show schematically a suggested arrangement for the coin handling apparatus to be used in conjunction with the vending machine. In this arrangement coins inserted into the appropriate slots in the coin panel 13 are tested by coin testers 26 of any well known structure, as for example, shown in the brochures "National Slug Rejectors 200 Series" and "National Slug Rejectors 600 Series" of the National Rejectors Inc., St. Louis, one coin tester being provided for each denomination of coin. Rejected coins drop into the chute 27 and thence into tray 14. Coins which are passed by the coin testers are guided down channels 28 to a common chute 30, whence they slide into receptacle 31. Each coin as it leaves its channel 28 strikes the arm of a micro-switch 29 associated with that channel, and the fact that it has been inserted is thus recorded and its value credited to the customer.

The bottom of receptacle 31 is formed of two flaps, 32 and 33. As soon as an article has been released, flap 33 opens under control of electromagnet CA in the direction indicated by the arrow and the coins slide down chute 35 into a coin box 36, which preferably is self-sealing. At any time before an article has been released the customer may, by operating lever 16 cause flap 32 to turn in the direction indicated by the arrow, whereupon the coins will slide down chute 34 into tray 17. At the same time an electrical contact 16C is operated by lever 16 and as will be explained later, the price lamps 7, 8 and 9 are returned to zero and the customer's credit is cancelled.

Circuits which may be used to operate the vending machine are now described with reference to Figs. 4 to 9 which are drawn on the detached contact principle, with all relay contacts shown in their unoperated position. The designation of each relay is shown in capital letters beside the coil of that relay and the same designation in small letters, followed by a number, is given beside each corresponding contact. In similar fashion the several rotary switches used have their designation in capital letters beside their magnet coils and in small letters, followed by a figure, against their contact arcs and wipers. These switches are preferably uniselector switches which are well known in the telephone art; these are shown in the drawings as having thirteen positions, but it will be appreciated that standard twenty-five-position switches could be used, the spare contacts being used to give increased capacity, by repeating the connections to the contact arcs or by simply causing the switches to step over the unwanted contacts. Thus it will be appreciated that the figure of twenty-five releasing devices mentioned previously has been reduced to thirteen in order to simplify the drawings.

A brief description of the operation of the vending machine is given hereafter. When a customer has chosen the articles he wants to purchase from the machine, he inserts money to the added-up value of these articles into corresponding coin slots. The various coins operate a counting switch (CS, Fig. 6) which transmits indications representing the values of the various coins to adding switches (PA, SA, Fig. 7) for the various denominations. These adding switches operate indicator lamps (7, 8, 9, Fig. 8) which indicate the credit which the customer has established by the tendering of coins. The customer then proceeds to select the chosen articles by pressing corresponding push buttons (SK1 . . . SK13, Fig. 4). When a button is pressed, a selector switch (SS, Fig. 4) is started to hunt for the operated button and at the same time to prepare a circuit for the release of an article from storage. Prior to the release, however, a check is made, whether the established credit is at least equal to the value of the selected article. This check is carried out by connecting a pricing frame (41, Fig. 5) pre-set in accordance with the values of articles dispensed by the machine, with the adding switches determining the credit. Rectifiers in these circuits permit to differentiate between a credit higher than or lower than the value of the selected article. As long as the credit is equal or higher than this value the circuit (Fig. 4) for the release mechanism is closed and the article is delivered to the customer.

A release indicating contact (TC, Fig. 4) is operated by the released article and starts now the resetting of the adding switches to reduce the credit by the value of the dispensed article. To simplify the arrangement switches are used which move in one direction only, and thus the subtraction is carried out by adding a complementary value. This adding procedure is carried out by the same relays which are used for the setting-up of the credit as will be described later on. When the credit has thus been reduced the customer can select the next article and so on until his credit is exhausted.

Indicating lamps (48 and 49, Fig. 7) give directions to the customer when he has to wait and when he can proceed in operating the next selection button.

If the customer has not exhausted his credit but wants to get his remaining credit back, he operates a change-giving button (ZK, Fig. 9) operating the change-giving device (Fig. 9) which delivers change depending on the setting of the various adding switches.

Before describing the various circuits in detail, a general description of the main functions of the various elements is given. Reference is made to the co-pending application of Peter L. Law and Alan D. Lackey, Serial No. 141,642 and filed February 1, 1950, which discloses a coin-controlled article dispensing system which is similar in some respects to the system described herein. When coins are inserted in corresponding coin slots of the machine to establish a credit, coin-relays ½D, 1D, 3D, 6D, 1S and 2S (Fig. 6) initiate the operation of a counting and adding device. This device includes a pilot relay CP operated together with any of the coin relays, a common counting switch and magnet CS, interrupter contact *cs*1, and the wipers and arcs *cs*2 . . . *cs*8, a penny adding switch and magnet PA, interrupter contact *pa*1, and wipers and arcs *pa*2 . . . *pa*10 and a shilling adding switch with magnet SA, interrupter contact *sa*1, and wipers and arcs *sa*2 . . . *sa*9. The stepping of switch CS is controlled by relay A, which in combination with relays B and F also controls the stepping of switch PA, and in combination with relays C and G controls switch SA thus co-ordinating the operation of the three switches.

Figure 8:
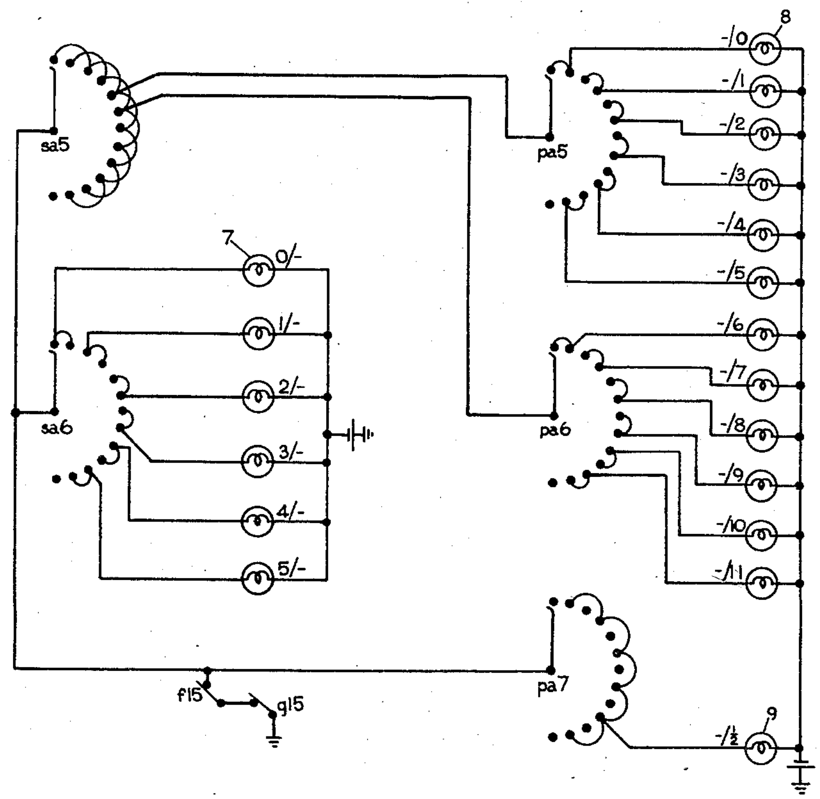
Fig. 8 illustrates circuits for indicating the amount at credit in the machine.
Figure 11:
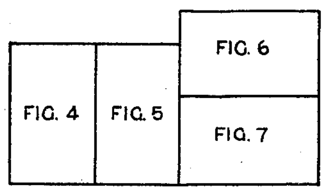
Fig. 11 shows how Figs. 4, 5, 6 and 7 may be fitted together to form a circuit diagram.

The amount tendered by a customer is indicated on a lamp indicator, shown in Fig. 8, which is operated over wipers and arcs *sa*5, *sa*6 and *pa*5, *pa*6, *pa*7 of the shilling adding switch SA and the penny adding switch PA respectively. In the example described hereafter the penny adding switch steps up one step for each halfpenny inserted, while the shilling adding switch steps one step for each sixpence inserted, thus making two steps for each shilling tendered.

Figure 4:
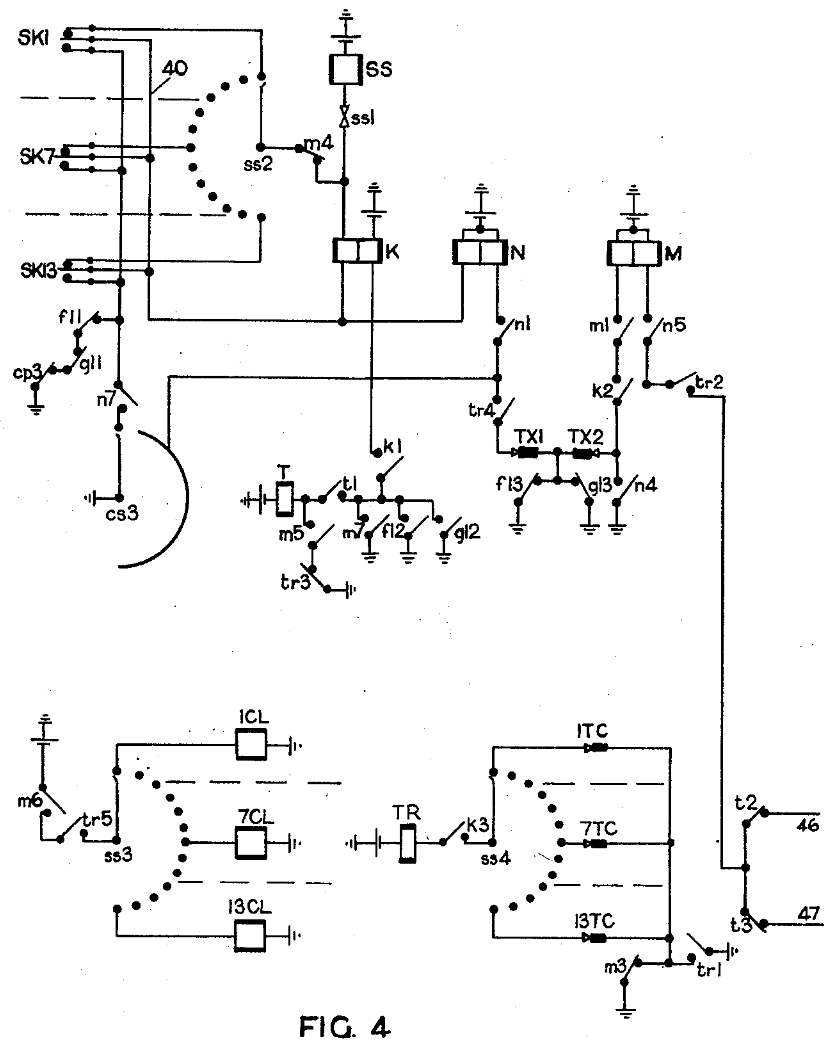
Figure 5:
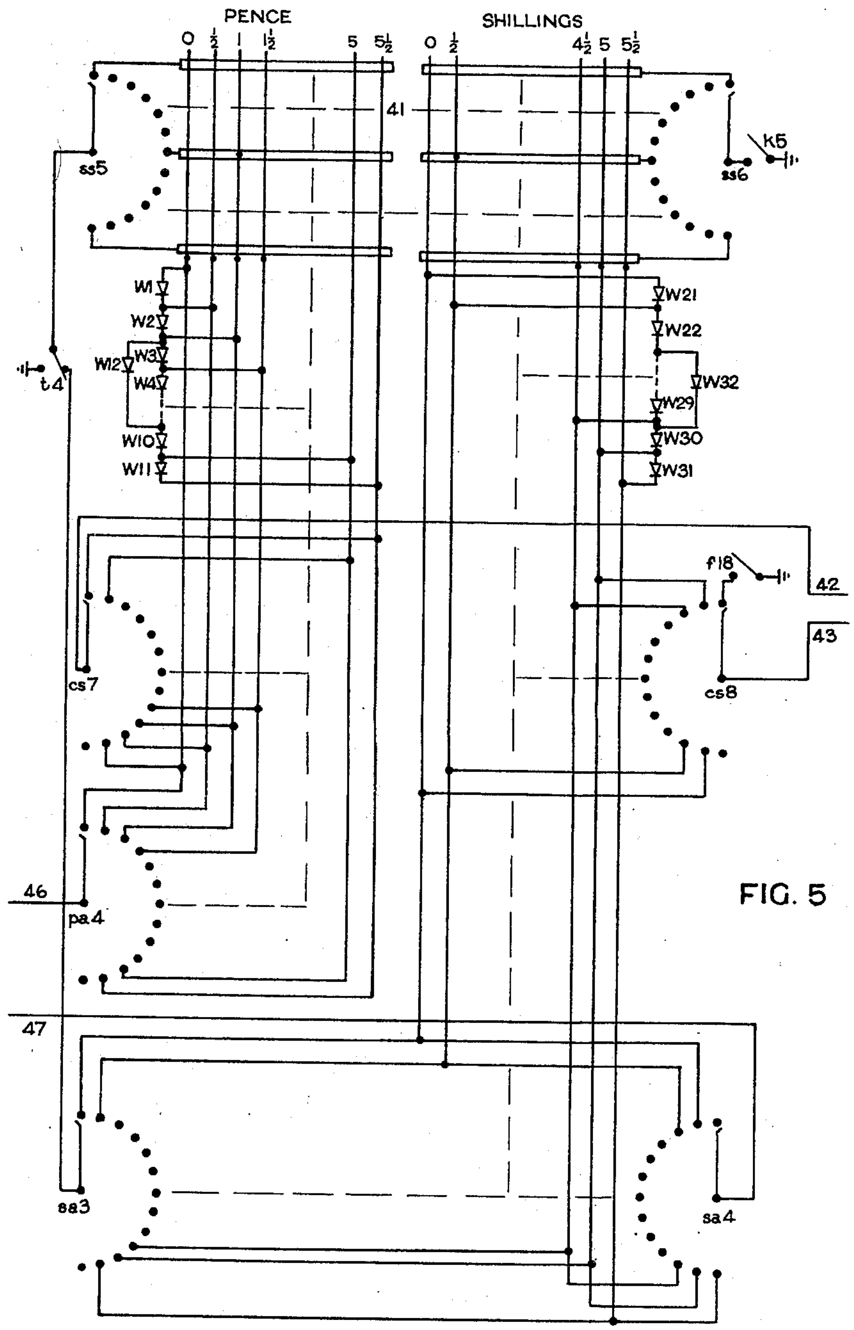

After the credit has been established in accordance with the price of the articles a customer wants to buy, the selection of the articles is performed by the pressing of appropriate buttons which operate the article selecting contacts SK1 . . . SK13 (Fig. 4). Operation of any of these contacts starts a selection switch with magnet SS, interrupter contact *ss*1, and wipers and arcs *ss*2 . . . *ss*6 to hunt for this contact and thus to establish a circuit for the K relay which checks that the amount at credit in the machine is sufficient to purchase the selected article. At the same time relay N is operated, which resets the counting switch CS in preparation for the subtracting operation and prevents a double delivery of articles in case the button is pressed for a longer period. Switch SS marks at its wipers and arcs *ss*5 and *ss*6 (Fig. 5) the pricing frame 41 on which vertical price leads for pence and shillings are electrically connected in accordance with the price of each article with horizontal bars representing the various articles. As indicated in Fig. 5, the price of the article corresponding to the seventh position on the switch is seven pence indicated by a connection of the 1 penny lead and the ½ shilling lead with the corresponding horizontal bars.

Over wiper and arc *ss*3 a circuit is prepared for one of the releasing magnets 1CL . . . 13CL for the various articles, and over wiper and arc *ss*4 a further circuit is prepared for the relay TR which is operated over contacts 1TC . . . 13TC as soon as relay K has operated and in turn controls the operation of the magnets 1CL . . . 13CL. As mentioned before, the storage and releasing devices can be those described above in connection with Fig. 13, the magnets 1CL . . . 13CL representing the clutch magnets and contacts 1TC . . . 13TC representing the trip contacts operated by articles at their release from their storage shelves.

The release of articles depends on the operation of the M relay which operates only when the available credit is equal to or exceeds the price of the selected article. This check is carried out over the circuits (Fig. 5) connected with the wipers and arcs *ss*5 and *ss*6 of the selection switch and *pa*4 and *sa*3, *sa*4 of the adding switches. In case the credit is equal to the price of the selected article as set up on the pricing frame 41 a direct connection for the operation is established from earth over contact *k*5, wiper and arc *ss*6 in the set position for the selected article, the corresponding shilling price lead, arc and wiper *sa*3 in the credit position, contact *t*4, wiper and arc *ss*5, the corresponding penny price lead, arc and wiper *pa*4 in the credit position, lead 46 to relay M (Fig. 4). In case the credit is higher than the price, similar circuits are set up over one or more of the rectifiers W1 . . . W11, W21 . . . W31 in their passing direction to operate relay M. When, however, the credit is lower than the price of the selected article marked on the pricing frame, one or more of the rectifiers are included in the circuit in the blocking direction, thus preventing an operation of relay M. To reduce the number of rectifiers which might be included in a circuit in series connection, additional rectifiers W12, W32 are connected in parallel to some of the other rectifiers. A detailed circuit description of these checking circuits will be given later.

The operation of relay M (Fig. 4) closes the circuit for a selected release magnet (1CL . . . 13CL) and the wanted article is released thereby temporarily interrupting the corresponding trip contact TC and releasing relay TR, which in turn releases relay N in case the article selecting contact SK1 . . . SK13 is in its normal position.

The price of the selected article has now to be deducted from the credit set up in the machine. This procedure is initiated by the relay T which operates depending on the operation of relay M and the release of relay TR. The deduction of the price from the credit is, in the embodiment shown, carried out by adding the difference between the price and the maximum indicating capacity of the switch plus an additional halfpenny to set the switches to zero. Thus the difference between the price and 6 shillings and 6 pence is added, the maximum capacity of the apparatus shown being 6/5½*d*. The complement of sixpence is added on the penny switch and the complement of six shillings on the shilling switch. This adding operation is carried out in a similar manner to the establishing of a credit mentioned before, but is this time under the control of the wipers and arcs *cs*7 and *cs*8 (Fig. 5) in connection with the price marking on the pricing frame 41. After the proper reduction in credit performed by the adding of a complement amount has been completed the selection of the next article can proceed in the same manner.

Further parts of the apparatus relating to the common driving means, re-setting at failure of delivery, change giving and the adaptation of the apparatus to any other kind of storage and releasing devices will appear from the following detailed description.

Figure 7:
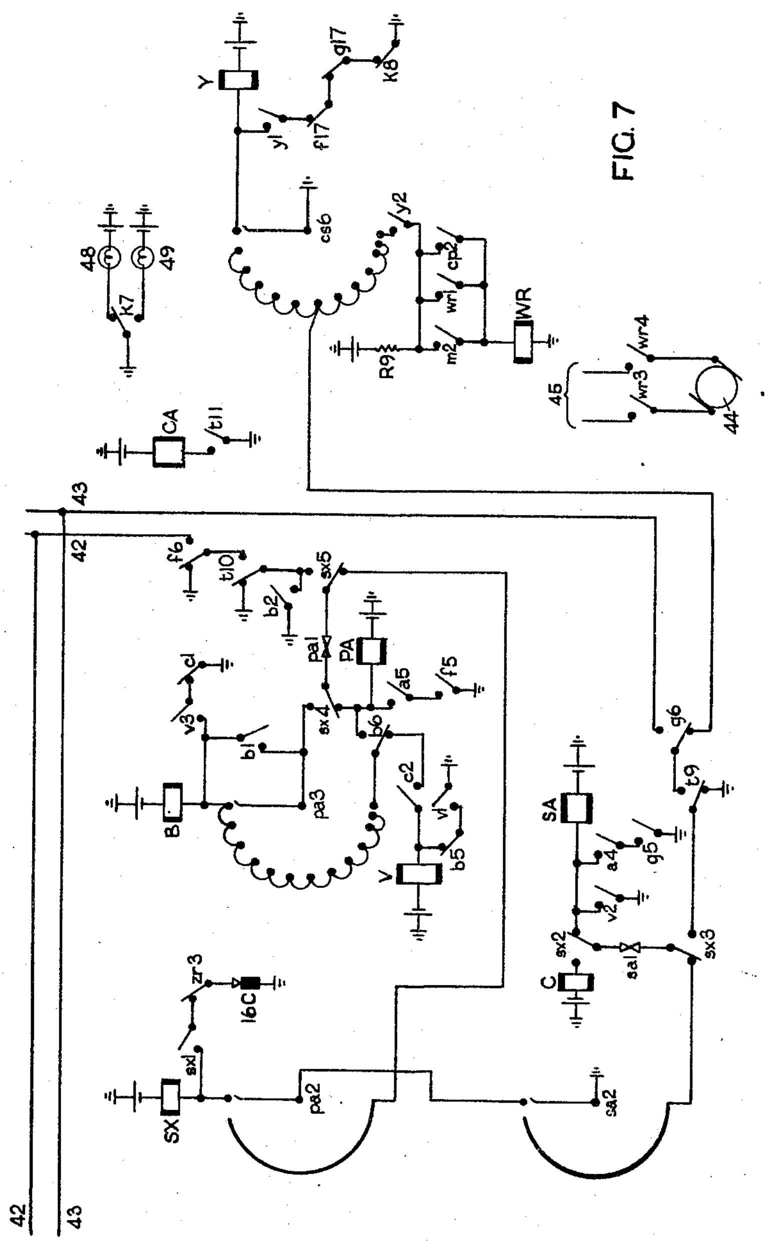

When power is first switched on to the machine the adding mechanism has first to be set to zero in case it was in an intermediate position, when the power was switched off. The two adding switches SA and PA are shown in Fig. 7, and switch SA homes first from earth at wiper and homing arc *sa*2, contact *sx*3, interrupter springs *sa*1, contact *sx*2, magnet SA, to battery. When magnet SA operates it interrupts its circuit at interrupter springs *sa*1, and steps forward. This action is repeated until the switch reaches its home contact when the circuit is broken and the earth transferred to wiper and homing arc *pa*2. A similar circuit is completed for homing switch PA from earth at wiper and home contact *sa*2, wiper and homing arc *pa*2, contact *sx*5, interrupter springs *pa*1, contact *sx*4, magnet PA to battery. This switch drives on to its home position when the circuit is broken and the earth transferred to relay SX, which operates and locks over operated contact *sx*1, contacts *zr*3 and 160C. This relay remains operated during all operations of the machine and is only released when money is refunded or change is given to cancel the indicated credit and re-set the switches.

Operated contacts *sx*2 and *sx*3 complete a circuit for relay C which operates from earth at contact *t*9, operated contact *sx*3, interrupter springs *sa*1, operated contact *sx*2, relay C to battery. Operated contacts *sx*4 and *sx*5 complete a circuit for relay B from earth at contact *t*10, operated contact *sx*5, interrupter springs *pa*1, operated contact *sx*4, wiper and home contact *pa*3, relay B to battery. Operated contacts *b*1 and *b*2 lock relay B around wiper and arc *pa*3 and contact *t*10 respectively. Contact *sx*6 appears on Fig. 9 and will be described later when referring to that figure.

Relay SX remains operated through all subsequent operations, except when coins are recovered by the customer or given in change. Relays B and C remain operated except during counting operations when they release to detect operation of the switch magnets.

To operate the machine the customer must first insert coins to establish a credit, so the action of counting the coins will first be described. The value of coins inserted is registered on two switches, one of which registers in halfpence and the other in sixpences. Provision is made for carrying forward amounts of sixpence when the halfpence switch reaches that value. For each coin inserted it is necessary to step the particular switch an appropriate number of steps, for example to register one penny involves stepping the halfpence switch two steps. A third switch is used to control the number of steps made, and is controlled by the coin relays ½D, 1D, 3D, 6D, 1S and 2S (Fig. 6), with contacts ½*d*1, ½*d*2, ½*d*3 . . . 2*s*1, 2*s*2, 2*s*3 respectively. The coin relays are initially operated by the corresponding coin-operated contacts ½DC, 1DC, 3DC, 6DC, 1SC, and 2SC (corresponding to switches 29 in Figs. 3A and 3B) and lock themselves over resistors R1 . . . R6.

For example, a shilling operates temporarily contact 1SC which completes a circuit for relay 1S. Relay 1S operates and locks over a circuit from earth, lower coil of relay 1S, operated contact 1*s*1, resistor R6 to battery. Operated contact 1*s*2 operates the coin pilot relay CP and operated contact 1*s*3 prepares a circuit for operation of relay G. Relay CP has four contacts but only one need be considered at this stage. Operated contact *cp*1 closes a circuit from earth, wiper and any contact of arc *cs*4 (except that contact connected to contact 1*s*3), either direct or through contacts of the unoperated coin relays to contact *k*4, operated contact *cp*1, contact *n*2, operated contacts *c*4 and *b*4 (relays B and C being operated as described previously), interrupter springs *cs*1, contacts *n*3, *f*3, *g*3, magnet CS to battery. Magnet CS operates and interrupts its circuit at interrupter springs *cs*1, and thus it stops its wipers round to their ninth contact.

As contact 1*s*3 is operated there is no circuit from the ninth contact to contact *k*4, and this switch stops stepping. From this position switch CS will now be driven around two steps, at the same time switch SA will be stepped around two steps, thus registering one shilling. This operation is started by a circuit from earth at wiper and ninth contact *cs*4, operated contact 1*s*3, contact *t*7, relay G to battery. Relay G operates and locks over a circuit from earth, second coil of relay G, contact *t*8, operated contacts *g*2 and *g*1, resistor R8 to battery. Relay G operates seventeen contacts but only the first ten will be considered at this stage as the rest play no part in this operation.

Operated contact *g*3 breaks the circuit to magnet CS and transfers it to relay A, but there is still no earth on this circuit as contact 1*s*3 is operated. Operated contact *g*4 by-passes contact *cp*1, which will shortly open. Operated contact *g*5 (Fig. 7) prepares a circuit for operation of magnet SA. Contact *g*6 has no function at this stage. Operated contact *g*10 (Fig. 6) prepares a locking circuit for relay A, while operated contacts *g*7, *g*8 and *g*9 prepare releasing circuits for relays 6D, 2S and 1S but only one of these circuits is effective, this being the circuit from earth at contact *t*13, wiper and arc *cs*5, operated contact *g*9, operated contact 1*s*1 to relay 1S. Thus relay 1S has earth on both sides of its coil and releases. This releases relay CP, which has no effect, as contact *cp*1 is by-passed by contact *g*4.

Contact 1*s*3 now applies earth from wiper *cs*4, through operated contact *g*4, contact *n*2, operated contacts *c*4 and *b*4, interrupter springs *cs*1, contact *n*3, contact *f*3, operated contact *g*3, relay A to battery. Relay A operates and closes two locking circuits, one from earth at operated contact *a*2, operated contact *c*3, operated contact *g*10 to relay A, and the other from earth at operated contact *a*1, interrupter springs *cs*1, contacts *n*3 and *f*3, operated contact *g*3, to relay A.

Operated contact *a*3 operates magnet CS and operated contact *a*4 (Fig. 7) operates magnet SA. Operated contact *a*5 has no function at this stage. Operation of magnets CS and SA prepares both switches to make a step and interrupter springs *cs*1 break one of the locking circuits for relay A. Interrupter springs *sa*1 (Fig. 7) break the circuit of relay C which releases. Contact *c*3 breaks the other locking circuit for relay A which releases, releasing magnets CS and SA and permitting both switches to make one step. The release of magnet SA restores the circuit through interrupter springs *sa*1 to relay C which re-operates and at *c*4 re-closes the circuit to relay A provided springs *cs*1 have also re-closed. Relay A re-operates and another step is made by both switches. After this next step, earth from wiper *cs*4 short-circuits relay G, which releases and reverts all circuits to normal. Switch SA has been moved on two steps, representing one shilling.

If, for example, a threepenny piece is inserted in the proper coin slot, contact 3DC is closed temporarily thus operating relay 3D, which locks itself over resistor R5 and contact 3*d*1 and operates relay CP over contact 3*d*2. Over contact 3*d*3 a circuit is prepared for relay F. In the same manner as described before switch CS steps around until wiper *cs*4 reaches the position on its arc connected with contact 3*d*3. The switch stops stepping as the connection to its magnet CS is interrupted at contact 3*d*3, and instead a circuit is closed from earth over wiper and arc *cs*4, operated contact 3*d*3, contact *t*6, relay F to battery. Relay F operates and closes a holding circuit over its second winding, contact *t*5, operated contacts *f*2 and *f*1, resistor R7 to battery. Contact *f*3 breaks the circuit of magnet CS and transfers it to relay A. Contact *f*4 by-passes contact *cp*1, and operated contact *f*5 (Fig. 7) prepares a circuit for magnet PA. Operated contact *f*10 prepares a locking circuit for relay A, while operated contacts *f*7, *f*8 and *f*9 prepare releasing circuits for relays 1D, ½D and 3D, but only the circuit from earth at contact *t*13, wiper and bank *cs*5, operated contact *f*9, operated contact 3*d*1 to relay 3D is complete. Thus relay 3D releases, releasing in turn relay CP.

Contact 3*d*3 now applies earth from wiper *cs*4 again through operated contacts *f*4, contact *n*2, operated contacts *c*4 and *b*4, interrupter springs *cs*1, contact *n*3, operated contact *f*3 to relay A and battery. Relay A closes two locking circuits at contacts *a*1 and *a*2, and at contact *a*3 operates magnet CS. At contact *a*5 (Fig. 7) a circuit is further closed for magnet PA, preparing both switches for stepping up. Interrupter springs *pa*1 break the circuit for relay B which releases and at contact *b*3 breaks the locking circuit for relay A, the other locking circuit being interrupted at interrupter springs CS1, so that relay A releases as well. Thus magnets CS and PA release again and the switches make one step. As relays A and B re-operate again the cycle is repeated and the switches CS and PA step up. After six steps, corresponding to six halfpennies or threepence, wiper *cs*4 puts earth on contact *f*1 thus short-circuiting relay F and reverting all circuits to normal. Switch PA in its position on the sixth contacts represents the tendering of threepence.

In a similar manner relays 6D and 2S, associated with suitably disposed contacts around arc *cs*4, count one pulse and four pulses respectively on switch CS and relays ½D and 1D count one pulse or two pulses on switch PA. The circuit of switch PA (Fig. 7) is arranged so that when the thirteenth position is reached it steps on to the first position again, and causes switch SA to make one step, thus carrying forward the amount of sixpence. Relay B normally operates over arc and wiper *pa*3, but on the thirteenth position this circuit is broken and a circuit is completed from earth at *t*10, operated contact *sx*5, interrupter springs *pa*1, operated contact *sx*4, wiper and thirteenth contact *pa*3, contact *b*6, operated contact *c*2 to relay V which operates and locks over operated contact *v*1 and contact *b*5.

Operated contact *v*2 operates magnet SA and interrupter springs *sa*1 release relay C. Contact *cl* operates relay B over operated contact *v*3, operated contact *b*5 then releases relay V, which is slow to release, and operated contact *b*6 completes a circuit from earth at operated contact *b*2, over operated contact *sx*5, interrupter springs *pa*1, operated contact *sx*4, wiper and thirteenth contact *pa*3, operated contact *b*6, PA magnet to battery. PA magnet operates, breaks its own circuit at interrupter springs *pa*1, then steps onto its first contact, where it resumes normal operation.

Thus coins of any value may be inserted in the machine and totalled. Should two or more coins of different value be inserted simultaneously, the apparatus will count them either simultaneously or in immediate succession, depending on the positions of the appropriate connections on arc *cs*4.

Fig. 8 shows the arrangement that may be used to indicate the amount at credit in the machine. The number of shillings is displayed on shillings lamps 7 by a circuit from earth over contacts *g*15 and *f*15, wiper and arc *sa*6 to the lamp representing the number of shillings registered. The number of pence is indicated on lamps 8 through circuits from earth over contacts *g*15 and *f*15, arc *sa*5, arc *pa*5 or *pa*6, depending on whether an odd sixpence is registered on switch SA, the appropriate lamp 8 to battery. An odd half-penny is displayed on lamp 9 through a circuit over arc *pa*7. The contacts *f*15 and *g*15 respectively extinguish the lamps while the apparatus is counting and the relays F and G are operated as described above.

Having established a credit in the machine the customer now presses a selecting button 11 (Fig. 1) which operates a selecting contact SK1–SK13 (Fig. 4). Assume that contact SK7 is operated. A stepping circuit is completed from earth at contact *cp*3, through contacts *g*11, *f*11, and operated contact SK7 to wire 40 and thence to relay N, which operates, and relay K which does not operate as earth is also applied from wire 40 and keys SK1 to SK13 (except SK7), arc and wiper *ss*2, contact *m*4, to the other side of K relay, and through interrupter springs *ss*1, SS magnet, to battery, thus causing switch SS to hunt for the unearthed contact connected to contact SK7.

Operation of relay N closes a locking circuit for this relay from earth at *cs*3 bank and operated contact *n*1. At this stage other effective contacts of relay N are contact *n*5 which prepares a circuit for relay M and contacts *n*2 and *n*3 (Fig. 6) which complete a homing circuit for switch CS from earth at *cs*2 wiper and arc, operated contact *n*2, operated contacts *c*4 and *b*4, interrupter springs *cs*1, operated contact *n*3, magnet CS to battery. Switch CS homes over this circuit and in the home position wiper *cs*3 (Fig. 4) applies earth through operated contact *n*7 bypassing contacts *f*11, *g*11 and *cp*3. When wiper *ss*2 has reached the seventh contact the earth is removed from this wiper as the key is operated and relay K operates in series with magnet SS which does not operate in this condition.

The wipers of switch SS are now standing on contacts connected to the circuits of the particular storage and releasing device selected. The operation of relay K completes circuits which check that the amount at credit in the machine is sufficient to purchase the required article, and if so, relay M will operate to release an article. Relay N will remain operated at least until the key has been released, to prevent more than one article being released.

On operation of relay K (Fig. 4), operated contact *k*1 will prepare a locking circuit for relay K, and operated contact *k*2 prepares a locking circuit for relay M, which has not yet operated. Operated contact *k*3 completes a circuit from earth at contact *m*3, over the trip contact 7TC, seventh arc contact and wiper *ss*4, operated contact *k*3, relay TR to battery. Relay TR operates and locks around contact *m*3 over operated contact *tr*1. At contact *tr*4 a further holding circuit for relay N is closed over contacts TX1 and *f*13 and *g*13 to lock relay N when the contact SK7 has been released. Operated contact *k*4 (Fig. 6) prevents the operation of switch CS or relay A by contact *cp*1, in case a coin should be inserted during the vending cycle. The only other contact of K which need be considered at this stage is contact *k*5 (Fig. 5) which in conjunction with operated contact *tr*2 (Fig. 4), prepares circuits for the operation of relay M.

Relay M is to operate only if sufficient credit has been built up in the machine to purchase the selected article. The price of the articles on each storage and releasing device is set up on a pricing frame, shown by 41 on Fig. 5, by means of which a connection may be made between a conductor representing each article and a conductor representing the price to be charged. Separate connections are set up for each denomination, in this case halfpence and sixpences. For example, if the seventh article were to sell at sevenpence, the connections would be as shown in Fig. 5, where a circuit is shown from the seventh contact of *ss*6 arc to the lead marked ½ shilling, and another from the seventh contact of *ss*5 arc to the lead marked 1 penny, giving a total of sevenpence.

Suppose now that sevenpence had been inserted in the machine. Switch SA would have made one step, and so wipers *sa*3 and *sa*4 (Fig. 5) would be standing on their second contacts, and switch PA would have made two steps and so wiper *pa*4 would be standing on its third contact. In this condition a circuit is completed from earth at *k*5, over *ss*6 wiper and seventh contact (corresponding to operation of the selected contact SK7), ½ shilling lead, second contact of *sa*3 arc, contact *t*4, *ss*5 wiper and seventh contact, 1 penny lead, third arc contact and wiper *pa*4 lead 46 (Figs. 5 and 4), contact *t*2, operated contacts *tr*2 and *n*5, relay M to battery. Relay M operates and locks over a circuit from earth at operated contact *n*4, operated contacts *k*2 and *m*1, relay M, to battery. Thus relay M operates when the coins inserted equal the price of the article.

It is necessary, however, to ensure that relay M will operate if the coins inserted exceed the price of the article. To achieve this, rectifiers W1 to W11 (Fig. 5), and W21 to W31 are inserted between the leads representing the various prices. Suppose for example the amount inserted in the previous case had been eleven pence. The same circuit can be traced as far as the 1 penny lead, but as wiper *pa*4 will be on its eleventh contact (representing fivepence) no direct circuit exists. Instead there is a circuit from the 1 penny lead, through rectifiers W3 to W10 in the pass direction, fivepence lead, eleventh contact of arc *pa*4, to relay M, and similar circuits may be traced for any other lead representing a value greater than the price.

A similar arrangement is made on the higher denomination side, only here an extra factor must be taken into account, for if the number of sixpences recorded is greater than that in the price, there is no need to check the adequacy of the pence inserted. For example, suppose five shillings had been inserted. A circuit then exists from earth at operated contact *k*5, wiper and arc *ss*6, ½ shilling lead, rectifiers W22 to W29 in the pass direction, 4½ shilling lead, eleventh contact and wiper *sa*4, lead 47 (Figs. 5 and 4), contact *t*3 to relay M, thus shunting the circuit through the 5 shilling lead and arcs and wipers *sa*3, *ss*5 and *pa*4. It will be noticed that rectifiers W12 and W32 are included in Fig. 5. These rectifiers are used only to reduce the maximum number of rectifiers in any series circuit.

Should the amount inserted be less than the price of the article, at least one of the rectifiers will be encountered in the blocking direction and so relay M will not operate. For example, if only one penny had been inserted the path from the ½ shilling lead would be through rectifier W21 in the blocking direction to the 0 shilling lead and wiper *sa*3, so that relay M would not operate. Thus operation of relay M indicates that the amount at credit in the machine is sufficient to purchase the selected article.

Relay M at operated contact *m*3 removes earth from the operating circuit of relay TR, at operated contact *m*4 prevents a direct earth over arc and wiper *ss*2 from operating magnet SS, at operated contact *m*5 prepares a circuit for operation of relay T and at contact *m*7 completes a locking circuit for relay K. Operated contact *m*6 applies battery through operated contacts *m*6 and *tr*5, wiper and arc *ss*3 to clutch 7CL, which releases an article from the selected storage and releasing device.

The release of the article operates the trip contact 7TC. This contact brings into operation circuits to deduct the price of the released article from the amount at credit and then to restore the apparatus ready to deliver another article or to accept more coins.

The momentary operation of trip contact 7TC releases relay TR which cannot re-operate as contact *m*3 is operated and contact *tr*1 has opened. Contact *tr*5 breaks the circuit to the clutch and contact *tr*4 releases relay N provided the key SK7 has been released. Contact *tr*2 breaks the circuit to the right-hand coil of relay M which still holds over its other coil.

Relay T operates over operated contact *m*5 and contact *tr*3 and locks over operated contact *t*1 to operated contact *m*7. Relay T changes over the circuits of the apparatus to subtract the price of the released article, which is done by adding the difference between that price and six shillings and sixpence, for, in the embodiment shown, the maximum capacity of the apparatus is 6/5½d. and another ½d. causes the switches to step onto zero. Thus subtraction may be carried out by adding the complement of this amount, effected in practice by adding the complement of sixpence on the penny switch (with halfpenny steps) and the complement of six shillings on the shilling switch (with sixpenny steps).

Operated contacts *t*2 and *t*3 disconnect the right hand coil of relay M from the pricing circuits, while contact *t*4 (Fig. 5) separates wipers *ss*5 and *sa*3, and puts earth on wiper *ss*5. Operated contacts *t*5 and *t*8 (Fig. 6) break the locking circuits for relays F and G and by applying earth to both sides of one coil of these relays, make them slow to release when they are operated again. Operated contacts *t*6 and *t*7 transfer the operating circuits of relays F and G to wipers *cs*7 and *cs*8 (Fig. 5) respectively, and operated contact *t*9 (Fig. 7) breaks the circuit for relay C, which releases. Operated contact *t*12 (Fig. 6) applies earth to contacts *f*4 and *g*4 which are not yet operated and operated contact *t*13 removes earth from wiper *cs*5, thus preventing the release of any operated coin relays during the subsequent rotation of switch CS. The flap 33 (Fig. 3) is operated by magnet CA (Fig. 7) which is operated by a circuit over operated contact *t*11, thus collecting into the apparatus the coins that have been deposited.

Relay F (Fig. 6) now operates from earth at operated contact *t*4 (Fig. 5), wiper and arc *ss*5, 1 penny lead, rectifiers W3 to W11, 5½ pence lead, first contact of arc and wiper *cs*7, lead 42 (Figs. 5, 7 and 6), operated contact *t*6, relay F to battery. When relay F operates relay G operates over a circuit from earth at operated contact *f*18 (Fig. 5), first contact of arc and wiper *cs*8, lead 43 (Figs. 5, 7 and 6), operated contact *t*7, relay G to battery. At contacts *f*13 and *g*13 (Fig. 4) the circuit for relay M is interrupted so that this relay now releases, as contact *n*4 is already open. The locking circuit for relay K is now maintained over contacts *f*12 and *g*12. Operation of contact *g*6 (Fig. 7) extends the earth from lead 43 over operated contacts *g*6, *t*9, *sx*3, interrupter springs *sa*1, operated contact *sx*2, to relay C which re-operates.

Relay C now completes a circuit for relay A (Fig. 6) from earth at operated contact *t*12, operated contacts *f*4 and *g*4 in parallel, contact *n*2, operated contacts *c*4 and *b*4, interrupter springs *cs*1, contact *n*3, operated contact *f*3, relay A to battery. Relay A operates and completes locking circuits over operated contacts *a*2, *b*3 and *f*10, over operated contacts *a*2, *c*3 and *g*10, and over operated contact *a*1, interrupter springs *cs*1, contact *n*3, operated contact *f*3, to relay A. Since both relays F and G are operated, relay A causes the operation of magnet CS, over contact *a*3, magnet PA (Fig. 7) over contacts *f*5 and *a*5, and magnet SA over contacts *g*5 and *a*4. Relays B and C release when interrupter springs *pa*1 and *sa*1 open, and as interrupter springs *cs*1 are also open, relay A releases. The three magnets release and the switches step up, closing their interrupter springs. Relays B, C and A re-operate and relays F and G hold to the earths on leads 42 and 43 from arcs *ss*5 and *ss*6 respectively, through one or more rectifiers as described above.

Switches CS, PA and SA continue to step around while earth remains on leads 42 and 43, and relays B, C and A are alternately operated and released, but in the case considered, after ten steps there will be no earth on lead 42. Switch CS is on its eleventh position and rectifier W2 is in circuit in the blocking direction. Relay B does not operate and, after its release lag, relay F releases. Relay B then operates again from earth at contact *f*6, over contacts *t*10, *sx*5, *pa*1, *sx*4, wiper and arc *pa*3, while relay C operates over lead 43, and relay A is operated in the above described manner. Switch PA cannot operate as contact *f*5 is open. Switches CS and SA make another step together, when rectifier W21 blocks current from flowing through lead 43 and prevents any further stepping. Relay G releases with a time lag as earth is blocked at rectifier W21 from lead 43.

Relays F and G are now released, so the locking circuit for relays T and K is broken at contacts *m*7, *f*12 and *g*12. These relays release and the apparatus is ready for the next operation.

The number of steps made by the switches PA and SA (10 steps and 11 steps) represents the addition of 5/11d. to the amount registered, but since the apparatus indicates zero for a total of 6/6d. this is equivalent to the substraction of sevenpence, which was the price of the article delivered. Should more than sevenpence have been inserted in the machine, the remaining credit will permit further articles to be released, the adequacy of the remaining credit being checked for each article selected, so that the machine may be operated several times until the credit is exhausted.

In the foregoing description, certain contacts have not been mentioned, or were stated to play no part in the operation at that stage. These contacts and their functions will now be described.

In Fig. 4 the earth to the contacts SK1 . . . SK13 is taken through contacts *cp*3, *g*11 and *f*11. This ensures that no selection of articles can be made until all coins inserted have been counted and these contacts have been restored to normal.

The contact *n*7 completes a locking circuit for relay N as long as one of the contacts SK1 . . . SK13 is pressed. Relay N in its operated condition delays the start of the subtracting operation at contacts *n*2 and *n*3 (Fig. 6) as long as a key is pressed, thus preventing a second article from being delivered if the key is pressed for a long period.

Two contacts TX1 and TX2 are shown in the locking circuits for relays N and M. These contacts are for the purpose of re-setting the apparatus if no article is delivered after the release device has operated for a period long enough to release an article if one were present in the storage and releasing device. These two contacts are opened mechanically by the driving motor 44 (Fig. 7), the cycle being such that contact TX2 opens and closes, then TX1 opens and closes, then there is an interval of several seconds and the cycle is repeated. When both relays M and N are operated, contact TX2 has no effect on relay M as it is locked over contact *n*4. When contact TX1 opens, however, relay N will release, provided the contacts SK1 . . . SK13 have been released and the switch CS has reached its home position. The next operation of contact TX2, several seconds later, will then release relay M, if no article has been released, and contact *m*7 will release relay K, and in turn, at contact *k*3, relay TR, thus restoring the apparatus to normal.

Figure 6:
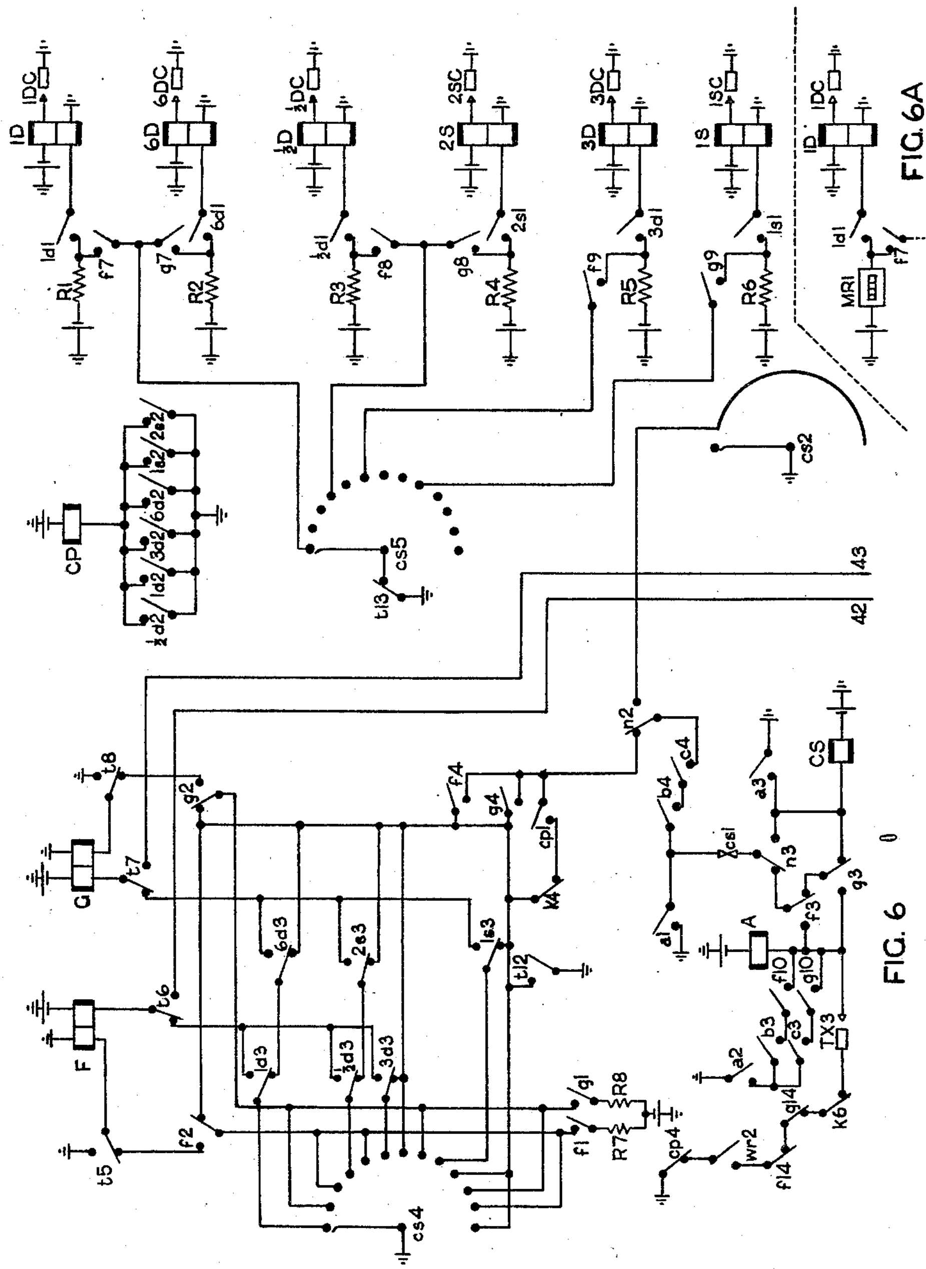

In Fig. 7 the motor for driving the machine is indicated at 44 and is supplied from a source of power at 45. To start the motor relay WR is energised over operated contact *cp*2 and resistor R9 when a coin is inserted or over operated contact *m*2 when an article is about to be delivered. This relay locks over contact *wr*1 and starts the motor over operated contacts *wr*3 and *wr*4. A time delay circuit for stopping the motor is closed by operated contact *wr*2 (Fig. 6). This contact applies earth to relay A through contact TX3 which is closed for a moment every few seconds. Relay A operates and steps switch CS one step. Contacts *cp*4, *f*14, *g*14 and *k*6 prevent this circuit interfering with the normal operation of relay A when any of the relays CP, F, G or K are operated. When switch CS reaches its first contact relay Y (Fig. 7) operates to earth on wiper *cs*6. Relay Y locks over operated contact *y*1 to contacts *f*17, *g*17 and *k*8. Twelve steps later, if relay Y has not been released by operation of any of these contacts, earth is applied by wiper *cs*6 over contact *y*2 to resistor R9, and relay WR, being earthed on both sides, releases and stops the motor. Any insertion of coins or pressing of buttons releases relay Y and thus starts the time delay over again.

A contact *k*7 of relay K is shown in Fig. 7 associated with two lamps 48 and 49. These lamps are for guidance of the customer and may bear instructions such as "Ready" and "Wait."

Associated with relay SK in Fig. 7 is a contact 16C. This contact is operated when the handle 16 (Fig. 1) is operated to release flap 32 (Fig. 3) and to return the coins inserted to the customer. Relay SX releases at interruption of contact 16C and restores the adding circuits to zero ready for the next operation.

A circuit that may be used with the machine to permit change to be given is shown in Fig. 9. In this figure magnets are shown which may form part of any type of change-giving devices, which do not form part of the invention. Change-giving devices which can be used are, for example, shown in U. S. Patent 1,961,537, the magnets ½DZ, 1DZ, 3DZ, 6DZ, 1SZ, 2SZ in Fig. 9 fulfilling the same function as the magnets 13*a* to 13*h* in U. S. Patent 1,961,537. The magnet 6DZ, for example, operates a device to issue a sixpence, magnet 1SZ operates a device to issue a shilling and magnets 2SZ each operate a separate device to issue two-shilling pieces. Similarly, magnet ½DZ controls the issue of a halfpenny, magnets 1DZ each issue a penny and magnet 3DZ issues a threepence. A key ZK may be provided, and when this is pressed, when relays F, G and K are unoperated and contacts *f*16, *g*16 and *k*9 closed, relay ZR operates and contact *zr*2 applies earth through operated contact *sx*6 to wipers *sa*7, *sa*8, *sa*9, *pa*8, *pa*9 and *pa*10. These wipers of the adding switches are standing on contacts representing the amount at credit and the arcs in Fig. 9 are connected as shown to magnets which when energized over contacts *zr*2, release the appropriate coins. To cancel the corresponding credit indication, contact *zr*3 (Fig. 7) releases relay SX which causes relay ZR to lock over operated contact *zr*1 to contact *sx*6 until the switches PA and SA have returned to zero as described earlier, and then relay SX re-operates to prepare the apparatus for the next operation.

The apparatus has been described so far with particular reference to the type of storage and releasing device shown in Fig. 13 but should it be desired to use the mechanism shown in Fig. 14 it is only necessary to replace the circuits shown in the lower half of Fig. 4 and related to wipers and arcs *ss*3 and *ss*4 by those of Fig. 10, which show the switch arcs *ss*3 and *ss*4, this time associated with horizontal magnets HM1–HM3 and vertical magnets VM1–VM5 which may be operated in various combinations to release the article required.

In this case relay TR operates as before on the operation of contact *k*3 over a trip contact TC and contact *m*3, and locks over contact *tr*1. Operated contact *tr*5 then closes a circuit for one of the horizontal magnets and when relay M operates, operated contact *m*6 completes a circuit from battery over contacts *rr*2 and *m*6, wiper and arc *ss*4 to one of the vertical magnets VM1–VM5. This magnet operates the ejector mechanism as described above, and, at the limit of its travel, operates temporarily a contact LC. Relay RR operates over this contact and locks from earth at operated contact *m*3, through operated contact *rr*1 to relay RR. Operated contact *rr*2 releases the vertical magnet VM1–VM5.

With this arrangement a common trip contact TC or individual contacts connected in series may be used and when an article strikes this contact relay TR releases, thus causing the price of the article to be subtracted as previously described; and when relay M releases it releases relay RR, thus restoring the circuit to normal. Should no article be released relay M will be released by the operation of timing contacts TX1 and TX2 (Fig. 4) and thus relay K will be released and in turn relay TR, returning the apparatus to normal without subtracting the price.

Figure 12:
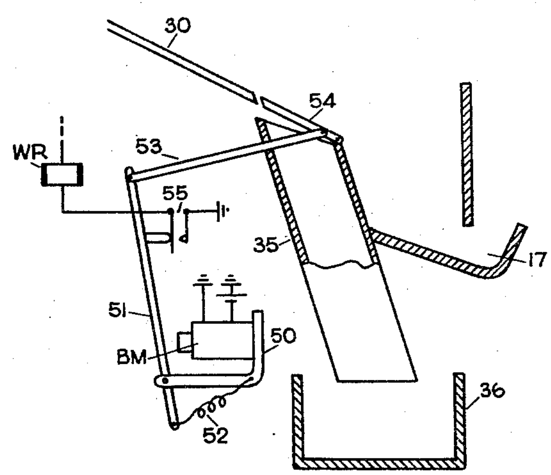
Fig. 12 shows a modification of the coin receiving arrangement as shown in Fig. 3.

The foregoing description shows the invention by way of examples only and modifications in the mode of operation as well as in the actual circuits can be made without departing from the spirit of the invention. If no coin-return prior to selection of an article is required the handle 16, the contact 16C, and the receptacle 31 with flaps 32 and 33 can be omitted, so that coins passed by the coin-tester are guided directly into the coin box 36. To return, however, coins inserted during power-failure caused either by failure in the mains or by blowing of a fuse, an arrangement as shown in Fig. 12 can be used. This arrangement consists of a normally energised magnet BM mounted on a yoke 50. The armature 51 is pivoted to the yoke 50 and is attracted by magnet BM against the force of a spring 52. The upper end of the armature is connected by a link 53 with a flap 54 which in its raised position connects the coin chute 30 with the chute 35 leading to the coin box 36. Thus normally coins passed by the coin testers (26 in Fig. 3) slide over chute 30 into chute 35 and into the coin-box 36. In case of power failure the magnet BM releases its armature 51 which under tension of spring 52 lowers flap 54 and thus connects chute 30 with the coin return tray 17 returning the coins to the customer. To prevent the operation of the machine when power has been restored but for any reason magnet BM has not yet operated, a contact set 55 is connected with the armature 51 and operated thereby. This contact set is included, as indicated, in the circuit of the motor switch relay WR (Fig. 7), so that the motor can drive the machine only when magnet BM is operated, thus preventing any possibility of article delivery in the coin return position of flap 54.

In many cases it might be advisable to get a record of all the sales made during a certain time. Such a record can be obtained by including coin meters for example in the form of message registers in the circuits of the coin relays. The message registers, which are well known in the telephone field, and are, for example, shown in Figs. 167 and 168 in the book "Telephony," vol. 1, by J. Atkinson, are stepped up in accordance with the number of coins inserted. The coin meters for the various types of coins replace the resistors R1 to R6 in Fig. 6 as shown by the coin-meter RM1 in Fig. 6A. As the operation of the machine depends on the circuits over the coin meters and short circuiting of a coin meter would result in a short circuit of the battery (power supply) no tampering with the meters is possible without throwing the machine out of action. Thus the coin meters give, under all circumstances, a true indication of the amounts collected by the machine. Furthermore, several customer positions and several delivery points may be provided, the articles selected at the various positions being automatically directed to the corresponding delivery points.

I claim:

1. Apparatus for vending articles having dispensing devices to store and dispense a plurality of selected articles of various character; value-recording means pre-settable in accordance with the value of each article to be dispensed; a coin-operated device adapted to accept a plurality of coins of the same and various denominations and including credit-registering means operable by said coins to register their value; article selecting means to select articles for dispensing; release indicating means operable by each dispensed article; checking means and electrical connections therefrom to said credit-registering means, said article selecting means, said value-recording means and said dispensing devices and operable by said article selecting means to check the pre-set value of any selected article against the credit registered by said credit-registering means and to close a circuit for the dispensing device of said selected article to effect the release of said article when the registered credit is at least equal to the pre-set value of said selected article; and electrical circuits associated with said checking means connecting said release indicating means, said value-recording means and said credit-registering means and operable at the release of said selected article to reduce the credit registered at said credit-registering means by the pre-set value of said article.

2. Apparatus for vending articles having dispensing devices to store and dispense a plurality of selected articles of various character; value-recording means pre-settable in accordance with the value of each article to be dispensed; a coin-operated device adapted to accept a plurality of coins of the same and various denominations, said coin-operated device comprising coin-detecting devices for checking the validity of coins tendered thereto, a rejection tray associated with said coin-detecting devices to receive coins rejected by said devices; a coin-chute associated with said coin-detecting devices to transfer coins passed as valid by said detecting devices, a coin-return tray, a coin-collecting receptacle, and coin-deflecting mean interposed between said coin-chute and said coin-return tray and operable to transfer coins from said chute to said coin-receptacle and said coin-return tray respectively, and credit-registering means operable by said valid coins to register their value; article selecting means to select articles for dispensing; release indicating means operable by each dispensed article; checking means and electrical connections therefrom to said credit-registering means, said article selecting means, said value-recording means and said dispensing devices and operable by said article selecting means to check the pre-set value of a selected article against the registered credit and to close a circuit for the dispensing device of said selected article to effect the release of said article; and electrical circuits associated with said checking means connecting said release indicating means, said value-recording means and said credit-registering means and operable at the release of said selected article to reduce the registered credit by the pre-set value of said article.

3. Apparatus for vending articles having electrically operable dispensing devices to store and dispense a plurality of selected articles of various character; value-recording means pre-settable in accordance with the value of each article to be dispensed; a coin-operated device adapted to accept a plurality of coins of the same and various denominations and including a counting switch to count the value of coins received and for each denomination an adding switch to add up said values; manually operable contact means for each selectable article; a selection switch and electrical connections therefrom to each of said contact means and said dispensing devices to prepare an electrical circuit for a selected dispensing device; checking means to check the setting of said value-recording means against the setting of said adding switches and to close said electrical circuit for the operation of said selected dispensing device; and relay means and electrical connections therefrom to said contact means and said checking means and operable by said contact means to prevent during the continuous operation of any of said contact means the repeated operation of said selected dispensing device and said checking means.

4. In an apparatus for vending articles having dispensing devices to store and dispense a plurality of selected articles of various character: common driving means for said dispensing devices; a coin-operated device adapted to accept a plurality of coins of the same and different denominations; article selecting means to select articles for dispensing; a timing device including a timing switch and first and second relay means; electrical connections from said first relay means to said common driving means, said coin-operated device, and said selecting means respectively to switch on said common driving means and said timing switch depending on the operation of said coin-operated device and said selecting means: and further electrical connections from said second relay means to said first relay means, said coin-operated device including said timing switch, and said selecting means to operate said second relay means within a predetermined time after the last operation of said coin-operated device and said selecting means, said second relay means releasing said first relay means for the switching off of said common driving means and said timing switch.

5. In an apparatus for vending articles as claimed in claim 4 a counting switch included in said coin-operated device and operable by tendered coins, a wiper and arc of said counting switch being included in said timing device; and contact means periodically operated by said common driving means to step said counting switch forward periodically.

6. Apparatus for vending articles having dispensing devices to store and dispense a plurality of selected articles of various character; value-recording means pre-settable in accordance with the value of each article to be dispensed; a coin-operated device adapted to accept a plurality of coins of the same and various denominations and including credit-registering means operable by said coins; article selecting means to select articles for dispensing; release indicating means operable by each dispensed article; checking means to check the pre-set values of selected articles against the credit registered by said credit-registering means and to effect the release of a selected article; electrical circuits associated with said checking means connecting said release indicating means, said value-recording means and said credit-registering means and operable at the release of a selected article to re-set said credit-registering means to a value reduced by the pre-set value of a dispensed article; and change giving means associated with said coin-registering means and operable thereby to dispense coins to the value of the remaining credit and to restore the credit-registering means to their initial position.

7. Apparatus for vending articles having dispensing devices to store and dispense a plurality of selected articles of various character; article selecting means for preparing said article dispensing devices for operation; credit-registering means settable in accordance with the value of coins received and including individual registering means for values in each of a plurality of denominations, said credit-registering means including transfer means to carry forward amounts exceeding one denomination into the next higher denomination; value-recording means pre-settable in accordance with the value of articles to be dispensed and recording values in a plurality of denominations; electrical connections between said credit-registering means and said value-recording means individual to each of said denominations; checking means operable over said electrical connections when the credit registering in all said denominations is equal to the values of articles selected by said selecting means and recorded by said value-recording means; and further electrical connections from said checking means to said article dispensing devices to operate said dispensing devices.

8. Apparatus for vending articles having dispensing devices to store and dispense a plurality of selected articles of various character; article selecting means for preparing said article dispensing devices for operation; credit-registering means settable in accordance with the value of coins received and registering values in a plurality of denominations, said credit-registering means being adapted to carry forward amounts exceeding one denomination into the next higher denomination; value-recording means settable in accordance with the value of articles to be dispensed and recording values in a plurality of denominations; electrical connections for each denomination between said credit-registering means and said value-recording means; rectifiers connected across said electrical connections for each denomination; checking means operable over said electrical connections and said rectifiers when the credit registering in all denominations exceeds the values of articles selected by said selecting means and recorded by said value-recording means; and further electrical connections from said checking means to said article dispensing devices to operate said dispensing devices.

9. Apparatus for vending articles as claimed in claim 8 and having additional rectifiers connected in parallel to a plurality of said rectifiers connected across said electrical connections for each denomination.

10. Apparatus for vending articles having dispensing devices to store and dispense a plurality of selected articles of various character; article selecting means including a selection switch for preparing said article dispensing devices for operation; credit-registering means to register the value of coins received and including a counting switch, and an adding switch for each denomination settable by said counting switch; value-recording means consisting of a first group of bars for each denomination, each bar being allotted to a particular kind of article to be dispensed and electrical connections therefrom to said selection switch, a second group of bars for each denomination, each bar representing a particular value in said denomination, and electrical connections between bars of said first groups and bars of said second groups to record the value of particular articles; further electrical connections between said bars of said second groups and said adding switches of corresponding denominations; checking means including a relay and electrical connections therefrom to said adding switches and operable over said further electrical connections when the credit represented by the setting of said adding switches is at least equal to the value of a selected article represented by the connections between a bar of said first group and a bar of said second group for each denomination; and electrical connections from said checking means to said dispensing devices to operate said dispensing devices prepared for operation by said selecting means.

11. Apparatus for vending articles having dispensing devices to store and dispense a plurality of selected articles of various character and including release-contact means operable at the release of any article; article selecting means for preparing said article dispensing devices for operation; credit-registering means including a counting switch to count the coins received, and an adding switch for each denomination to add up the value of coins received in each denomination; value-recording means pre-settable in accordance with the values of articles to be dispensed; checking means to compare the settings of said credit-registering means and said value-recording means and to operate dispensing devices prepared by said article selecting means; and changeover switching means operable by said checking means and said releasing contact means and electrically connected with said credit-registering means to connect said counting switch with said value-recording means at the release of articles from said dispensing devices and to step up said counting switch and said adding switches to add in said credit-registering means the difference between the sum of the highest and lowest value which can be registered at said credit-registering means and the value recorded at said value-recording means for each dispensed article.

12. Apparatus for vending articles having dispensing devices to store and dispense a plurality of selected articles of various character; value-recording means pre-settable in accordance with the value of each article to be dispensed; a coin-operated device adapted to accept a plurality of coins of the same and various denominations and including credit-registering means operable by said coins to register their value; manually operable contact means for each selectable article, a selection switch including a plurality of wipers and corresponding contact banks and electrical connections from one of said contact banks to each of said contact means; stepping means for said selection switch and electrical connections therefrom to all said contact means to operate said wipers to hunt for any operated contact means and to prepare over another of said contact banks electrical circuits for the operation of a dispensing device storing a selected article; blocking means interposed in the operating circuits of said stepping means and operable by said coin-operated device to block the operation of said selection switch during operation of said coin-operated device; and checking means and electrical connections therefrom to said credit-registering means to check the pre-set value of said selected article against the credit registered by said credit-registering means and to complete said electrical circuits for said dispensing device to release said article therefrom when the registered credit is at least equal to the pre-set value of said selected article.

13. Apparatus for vending articles having electrically operable dispensing devices to store and dispense a plurality of selected articles of various character; value-recording means pre-settable in accordance with the value of each article to be dispensed; a coin-operated device adapted to accept a plurality of coins of the same and various denominations and including a counting switch to count the value of coins received, for each denomination an adding switch to add up said values and a stepping circuit for each of said switches; manually operable contact means for each selectable article; a selection switch and electrical connections therefrom to each of said contact means and said dispensing devices to prepare an electrical circuit for a selected dispensing device; checking means to check the setting of said value-recording means against the setting of said adding switches and to close said electrical circuit for the operation of said selected dispensing device; and relay means and electrical connections therefrom to said contact means and said checking means and operable by said contact means to prevent during the continuous operation of any of said contact means the repeated operation of said selected dispensing device and said checking means, said relay means including contacts interposed in the stepping circuit of said counting switch to return said counting switch to its initial position.

14. Apparatus for vending articles having dispensing devices to store and dispense a plurality of selected articles of various character; a coin-operated device having a plurality of coin-receiving means adapted to accept a plurality of coins of the same and various denominations and including credit-registering means, switching means for each of said coin-receiving means operable by coins tendered to said coin-operated device, a coin-relay associated with each of said switching means and operable thereby, a counting switch and electrical connections from said counting switch to said coin-relays and said credit-registering means to transmit to said credit-registering means indications representing the values of said coins operating said switching means, and further switching means interposed in said electrical connections; article selecting means including electrical contact means operable for the selection of articles for dispensing, a selection switch and electrical connections therefrom to each of said contact means and said dispensing devices to prepare electrical circuits for the operation of said dispensing devices in accordance with the operation of said electrical contact means; electrical connections from said further switching means to said article selecting means to actuate said further switching means to interrupt the operating circuit of said counting switch during the operation of said article selecting means; and further electrical connections from said credit-registering means to said dispensing devices to complete said electrical circuits for the dispensing devices of articles selected by said contact means.

15. Apparatus for vending articles having dispensing devices to store and dispense a plurality of selected articles of various character; common driving means for said dispensing devices; article selecting means for preparing said article dispensing devices for operation, release indicating means operable by each dispensed article; value-recording means pre-settable in accordance with the values of articles to be dispensed; credit-registering means settable in accordance with the value of coins received; electrical connections between said value-recording means and said credit-registering means; checking means operable over said electrical connections depending on the settings of said value-recording means and said credit-registering means; further electrical connections from said checking means to said article dispensing devices and said release indicating means to operate said article dispensing devices and to interrupt the operating circuits of said checking means at the release of an article from any of said dispensing devices; and contact means periodically operated by said common driving means and interposed in said operating circuits of said checking means to interrupt said operating circuits and release said checking means within a predetermined time after operation.

16. In an apparatus for vending articles having dispensing devices to store and dispense a plurality of selected articles of various character: a coin-operated device having a plurality of coin-receiving means adapted to accept a plurality of coins of the same and various denominations and including switching means for each of said coin-receiving means operable by coins tendered to said coin-operated device, a coin-relay associated with each of said switching means and electrical connections therefrom to said switching means; a counting switch and electrical connections therefrom to said coin-relays and operable by said coin-relays upon the operation thereof by said switching means; an adding switch for each denomination in the values of articles stored for dispensing; first relay means and electrical connections therefrom to said adding switches and said counting switch and selectively operable by said counting switch in accordance with the value of each coin tendered to said coin-operated device, said first relay means having contacts included in the electrical connections of said coin-relays to release any operated coin-relay upon the joint operation of said counting switch and said first relay means; second relay means associated with said counting switch and electrical connections therefrom to said first relay means and said adding switches; and third relay means associated with said adding switches and having contacts interposed in the electrical circuits of said second relay means for the joint operation of said counting switch and said adding switches depending on the operation of said first relay means to add up independently the values in different denominations on the corresponding adding switches.

17. In an apparatus for vending articles having dispensing devices to store and dispense a plurality of selected articles of various character: switching means operable by coins of the same and various denominations; coin-relays and electrical connections therefrom to said switching means and operable thereby; a counting switch including an operating magnet and an interrupter contact operable thereby; an electrical circuit for said counting switch including contacts of said coin-relays to operate said counting switch; an adding switch including an operating magnet and an interrupter contact for each denomination in the value of articles stored for dispensing; first relay means and electrical connections therefrom to said adding switches and said counting switch and selectively operable by said counting switch in accordance with the value of each coin tendered to said switching means; second relay means associated with said counting switch and electrical connections therefrom to said first relay means and said adding switches; third relay means associated with said adding switches and having contacts interposed in the electrical circuits of said second relay means for the joint operation of said counting switch and said adding switches depending on the operation of said first relay means; and means to return said adding switches to their initial position, said means including fourth relay means having contacts and electrical connections therefrom to the operating magnets and the corresponding interrupter contacts respectively of said adding switches, said contacts of said fourth relay means upon operation closing a circuit for each operating magnet of said adding switches over its corresponding interrupter contact.

18. Apparatus for vending articles having dispensing devices to store and dispense a plurality of selected articles of various character; article selecting means and electrical connections therefrom to said dispensing devices for the selective operation thereof; a coin-operated device adapted to accept a plurality of coins of the same and different denominations; credit-registering means including adding switches movable in one direction and electrical connections therefrom to said coin-operated device to set said adding switches in accordance with the added-up value of coins received by said coin-operated device; value-recording means pre-settable in accordance with the value of any article to be dispensed and electrical connections therefrom to said selecting means; and electrical switching means and electrical connections therefrom to said credit-registering means and said value-recording means and operable after the dispensing of an article to interconnect said credit-registering means and said value-recording means for adding in said credit-registering means the difference between the sum of the highest and lowest value which can be registered at said credit-registering means and the value recorded at said value-recording means for said dispensed article to reduce the registered credit by the recorded value of said article.

References Cited in the file of this patent

UNITED STATES PATENTS

| | | |
|---|---|---|
| 1,972,449 | Johnson | Sept. 4, 1934 |
| 2,083,947 | Furber | June 15, 1937 |
| 2,249,236 | Tratsch | July 15, 1941 |
| 2,323,255 | Sutherland | June 29, 1943 |
| 2,327,154 | Osborne | Aug. 17, 1943 |
| 2,354,896 | Weiler | Aug. 1, 1944 |
| 2,511,996 | Robineau | June 20, 1950 |

FOREIGN PATENTS

| | | |
|---|---|---|
| 511,285 | Great Britain | Aug. 10, 1939 |